INVENTOR

ALOYSIUS I.M. KEULEMANS

BY

AGENT

United States Patent Office 3,531,919
Patented Oct. 6, 1970

3,531,919
METHOD OF MANUFACTURING A SEPARATING COLUMN OF A VITREOUS MATERIAL FOR USE IN AN APPARATUS FOR GAS CHROMATOGRAPHY
Aloysius Ignatius Marie Keulemans, Eindhoven, Netherlands, assignor, by mesne assignments, to U.S. Philips Corporation, New York, N.Y., a corporation of Delaware
Filed July 1, 1968, Ser. No. 741,666
Claims priority, application Netherlands, July 5, 1967, 6709298
Int. Cl. B01d 15/08
U.S. Cl. 55—386   2 Claims

ABSTRACT OF THE DISCLOSURE

A gas chromatography separating column having a helically extending aperture formed by inserting a vitreous rod into a vitreous tube which is heated to its softening point and drawn to reduce the diameter thereof while it rotates about its axis to fuse the vitreous rod to the wall of the tube and to form a helical configuration of both the rod and the inner wall of the tube.

---

The invention relates to a method of manufacturing a separating column of a vitreous material for use in apparatus for gas chromatography, in which a tube of the vitreous material is passed through a space at a high temperature in which the material softens, the part of the tube which is passed through the space being drawn with a constant force so that the diameter of the tube is reduced to the desired size.

The invention also relates to a separating column manufactured by this method and to an apparatus for gas chromatography which contains a separating column manufactured by this method.

The term "gas chromatography" is to be understood to mean a method of separating constituents in the gas phase which enables a high resolving power and hence a good separation between gaseous compounds to be obtained. For this purpose, the substance to be investigated is passed, usually as a mixture with a carrier gas, through a separating column filled with an adsorbent. In the separating column the substance is separated in its various constituents, which leave the column in time sequence. The constituents are detected when leaving the column.

Hitherto use has generally been made of a separating column in the form of a long cylindrical tube, the diameter of which is very small compared with its length. A long thin tube, even when rolled into a coil, occupies comparatively much space. A thin-walled tube of vitreous material has the additional disadvantage of being fragile.

It is an object of the invention to obviate these disadvantages. For this purpose, it is characterized in that a rod of a vitreous material is inserted in the tube and is passed together with the tube through the high-temperature space, and in that the tube is given a rotation movement such that the axis of the tube and the axis of rotation coincide.

During the rotation of the tube the rod, which is arranged substantially parallel to the tube of the axis, remains in engagement with the tube wall because of the centrifugal force.

Figure 1:
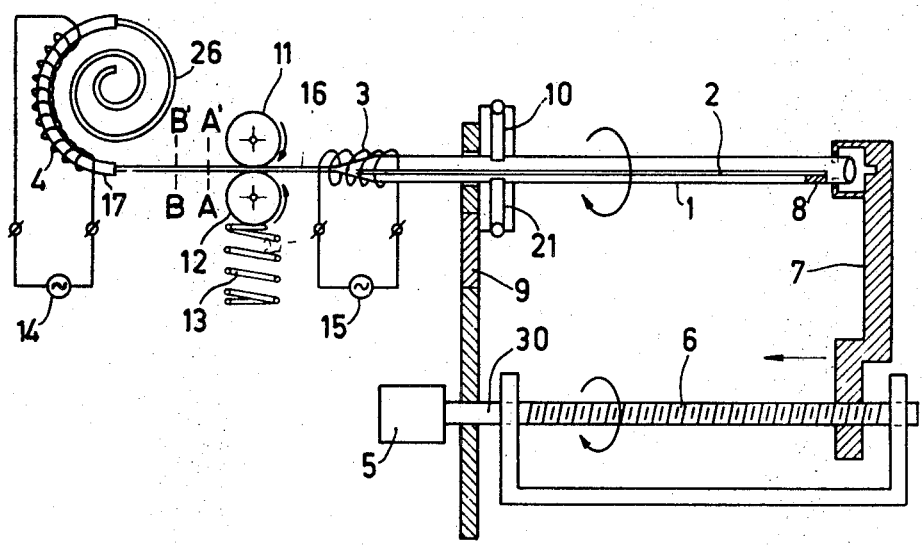
Figure 2A:
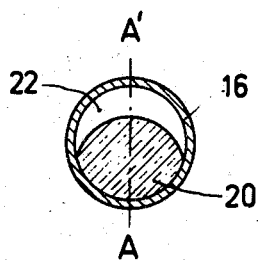
Figure 2B:
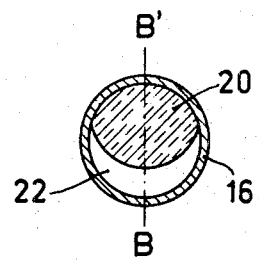

The invention will now be described more fully with reference to the accompanying diagrammatic drawing, in which FIG. 1 shows an arrangement for carrying out the method in accordance with the invention, and FIGS. 2a and 2b are cross-sectional views of a separating column manufactured by the method in accordance with the invention.

In FIG. 1, a glass rod 1 shown with exaggerated diameter is given two movements. Firstly, a movement in an axial direction. For this purpose, a motor 5 imparts a rotation to a lead screw 6. A slide rest 7 which cooperates with the lead screw 6 is given a movement in a straight line and hence the tube 1 held by the slide rest 7 is given a movement in an axial direction.

Secondly, the rotation movement of a shaft 30 coupled to the motor 5 is transmitted through gears 9 to rollers 10 and 21 which thrust against the tube 1 with a light pressure so as to compel it to rotate.

The rotating tube 1 is led into a high-temperature space indicated by a helical heater 3. In this space the glass is softened. By the action of drawing rolls 11 and 12 the diameter of the softened glass tube 1 is reduced to the desired size. Factors which determine the size of the diameter are: the speed of rotation of the drawing rolls 11 and 12 and the temperature of the furnace fed from a generator 15. By a spring 13 the drawing roll 12 is thrust with some pressure against the small-diameter glass tube 16. Owing to the thrust force of the rolls 11 and 12 the tube 16 no longer rotates beyond these rolls.

The tube 1 contains a glass rod 2 which at 8 is secured to the internal wall of the tube. The rod 2, which extends substantially parallel to the axis of the tube 1, is given the same speeds of translation and rotation as the tube 1. The rod is pressed into engagement with the internal wall of the tube 1 by the centrifugal force due to the rotation. In the high-temperature space the rod 2 also is softened. As a result of the rotation it assumes a substantially helical configuration which fuses to the tube wall. The tube 16 with reduced diameter internally has a corresponding substantially helical configuration. The shape and the dimensions of the configuration are determined by the thickness of the rod 2, the rotation speed of the tube 1, the translation speed of the tubes 1 and 16 and the temperature of the furnace, which itself is determined by the energy consumed by the helical heater 3.

FIGS. 2a and 2b are cross-sectional views of the configuration taken along the lines A–A′ and B–B′, respectively. The aperture 22 runs in the form of a helix or meander through the narrowed tube 16.

The tube 16 is rolled into a coil. For this purpose, it is guided through a semicircular metal tube 17 which is heated by a helical heater 4 connected to a voltage supply source 14. The glass tube emerging from the tube 17 can be collected as a coiled tube 26 and the coil may be used as a separating column. This separating column is comparatively short because the effective flow path of the gases traversing it is large owing to the internal configuration of the tube. This path may be larger by a factor of, say, 3 than that in a column comprising a tube of constant internal diameter. The mechanical strength of the column is larger than that of a column of constant diameter, for the wall is thickened by the meandering configuration 20.

Compared with the known separating column, a separating column manufactured by the method in acordance with the invention has the advantage that there is no migration of liquid along its internal wall. The adsorbent may be provided in the column in the form of evenly distributed film. Liquids which do not readily adhere to the wall may successfully be used as the adsorbent.

In a practical embodiment manufacture started from a glass tube 1 having an external diameter of 4 mms. and an internal diameter of 0.6 mm. The rod 2 had a diameter of 0.3 mm.

The product was a tube 16 having an external diameter of 1 mm. and an internal diameter of 0.2 mm. The substantially helical configuration 20 had a pitch of 0.4 mm. The thickness of the helical filament was about 0.1 mm.

Obviously, the apparatus shown in FIG. 1 need not be arranged horizontally but may alternatively be arranged vertically.

What is claimed is:

1. A method of manufacturing a separating column of a vitreous material for use in an apparatus for gas chromatography comprising the steps of inserting a rod of a vitreous material into a tube of the vitreous material, heating the tube with the rod therein to a temperaure at which the material of the tube softens, drawing the tube through a constricted opening to reduce the diameter thereof, simultaneously rotating the tube about the axis thereof several times with the rod therein to fuse the rod to the tube and form a helical configuration therewith, and applying within the tube a non-adherent liquid absorbent.

2. A separating column for gas chromatography comprising a vitreous tube having a vitreous rod fused to the inner wall thereof, said tube and said rod having a helical configuration and said rod defining a helically extending aperture within the tube, and a non-adherent liquid adsorbent within the tube.

References Cited

UNITED STATES PATENTS 2,608,722   9/1952   Stuetzer.
3,182,394   5/1965   Jentzsch _____ 55—386 X
3,283,483   11/1966  Halasz et al. _____ 55—386

JAMES L. DECESARE, Primary Examiner